US010615580B2

(12) United States Patent
Shimizu et al.

(10) Patent No.: US 10,615,580 B2
(45) Date of Patent: Apr. 7, 2020

(54) WIRE HARNESS

(71) Applicants: AUTONETWORKS TECHNOLOGIES, LTD., Yokkaichi-shi, Mie (JP); SUMITOMO WIRING SYSTEMS, LTD., Yokkaichi-shi, Mie (JP); SUMITOMO ELECTRIC INDUSTRIES, LTD., Osaka-shi, Osaka (JP)

(72) Inventors: Takeshi Shimizu, Yokkaichi (JP); Kouji Fukumoto, Yokkaichi (JP); Masaharu Suetani, Yokkaichi (JP)

(73) Assignees: AUTONETWORKS TECHNOLOGIES, LTD., Mie (JP); SUMITOMO WIRING SYSTEMS, LIMITED, Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/303,527

(22) PCT Filed: May 30, 2017

(86) PCT No.: PCT/JP2017/020010
§ 371 (c)(1),
(2) Date: Nov. 20, 2018

(87) PCT Pub. No.: WO2017/209095
PCT Pub. Date: Dec. 7, 2017

(65) Prior Publication Data

US 2019/0273367 A1 Sep. 5, 2019

(30) Foreign Application Priority Data

Jun. 3, 2016 (JP) ................................ 2016-111564

(51) Int. Cl.
*H02G 3/04* (2006.01)
*H01B 7/00* (2006.01)
(Continued)

(52) U.S. Cl.
CPC ....... *H02G 3/0468* (2013.01); *B60R 16/0215* (2013.01); *H01B 7/00* (2013.01);
(Continued)

(58) Field of Classification Search
CPC . H02G 3/0468; H01B 7/0045; B60R 16/0207
See application file for complete search history.

(56) References Cited

U.S. PATENT DOCUMENTS

| | | | | |
|---|---|---|---|---|
| 2007/0089892 A1* | 4/2007 | Pawlowski | ............... | F16L 3/26 174/28 |
| 2013/0319758 A1* | 12/2013 | Toyama | ............. | B60R 16/0215 174/70 R |

(Continued)

FOREIGN PATENT DOCUMENTS

| | | |
|---|---|---|
| DE | 1 2013 004193 T5 | 5/2015 |
| DE | 11 2014 002914 T5 | 3/2016 |

(Continued)

OTHER PUBLICATIONS

Jun. 27, 2017 Search Report issued in International Patent Application No. PCT/JP2017/020010.

(Continued)

*Primary Examiner* — Timothy J Thompson
*Assistant Examiner* — Amol H Patel
(74) *Attorney, Agent, or Firm* — Oliff PLC

(57) ABSTRACT

A wire harness that includes an electrical wire; a rod-shaped rigidity body, which is fixed to a portion of the electrical wire along a lengthwise direction of the electrical wire, to
(Continued)

provide the portion of the electrical wire with rigidity; and a corrugated tube covering the electrical wire and entirely covering the rigidity body.

7 Claims, 5 Drawing Sheets

(51) Int. Cl.
*B60R 16/02* (2006.01)
*H02G 3/36* (2006.01)

(52) U.S. Cl.
CPC ............. *H01B 7/0045* (2013.01); *H02G 3/04* (2013.01); *B60R 16/0207* (2013.01); *H02G 3/36* (2013.01)

(56) References Cited

U.S. PATENT DOCUMENTS

2014/0131062 A1* 5/2014 Masuda ............. B60R 16/0215 174/68.3
2014/0151115 A1* 6/2014 Ichikawa ............ B60R 16/0207 174/70 R
2014/0231135 A1 8/2014 Okuhara
2016/0064906 A1 3/2016 Wakabayashi et al.
2016/0101747 A1 4/2016 Inao et al.
2016/0322796 A1 11/2016 Sugimoto et al.

FOREIGN PATENT DOCUMENTS

JP 2000-197237 A 7/2000
JP 2007-221085 A 8/2007
JP 2013-13177 A 1/2013
JP 2013-115861 A 6/2013
JP 2013-243900 A 12/2013
JP 2015-104247 A 6/2015
JP 2015-163007 A 9/2015

OTHER PUBLICATIONS

Jun. 26, 2019 Extended Search Report issued in European Patent Application No. 17806649.4.

* cited by examiner

WIRE HARNESS

This application is the U.S. National Phase of PCT/JP2017/020010 filed May 30, 2017, which claims priority to JP 2016-111564 filed Jun. 3, 2016, the entire disclosure of which is incorporated herein by reference.

BACKGROUND

The present disclosure relates to a wire harness.

JP 2013-243900A discloses a wire harness in which an electrical wire is covered with a corrugated tube having a flexible tube portion and a non-flexible tube portion.

SUMMARY

In the technique disclosed in JP 2013-243900A, because the bending rigidity of a non-flexible tube portion of a corrugated tube is high, the bending rigidity of that portion of a wire harness where the non-flexible tube portion is provided is high. In a corrugated tube, it is necessary to change the mold for manufacturing the corrugated tube in order to change the length and position of the non-flexible tube portion, and thus the length and position of the non-flexible tube portion cannot be easily changed. Accordingly, in a wire harness, changing the length and position of a portion having high bending rigidity is not easy.

An exemplary aspect of the disclosure provides a technique that makes it possible, in a wire harness, to easily change a portion having high bending rigidity.

A wire harness according to a first aspect includes: an electrical wire; a rigidity body, which is fixed to a portion of the electrical wire along a lengthwise direction of the electrical wire, to provide the electrical wire with rigidity; and a corrugated tube covering the electrical wire and entirely covering the rigidity body.

A wire harness according to a second aspect is the wire harness according to the first aspect, wherein the rigidity body is made of metal.

A wire harness according to a third aspect is the wire harness according to any one of the first or second aspect, wherein the rigidity body has a straight-rod shape.

A wire harness according to a fourth aspect is the wire harness according to any one of the first or second aspect, wherein the rigidity body spirally surrounds a periphery of the portion of the electrical wire.

A wire harness according to a fifth aspect is the wire harness according to any one of the first to fourth aspects including: a fixing member for fixing the rigidity body to the portion of the electrical wire, wherein the fixing member is wrapped around the rigidity body and the portion of the electrical wire, and is provided from one end to the other end in a lengthwise direction of the rigidity body.

A wire harness according to a sixth aspect is the wire harness according to any one of the first to fifth aspects, wherein the rigidity body keeps the portion of the electrical wire in a straight shape.

A wire harness according to a seventh aspect is the wire harness according to any one of the first, the second, and the fourth aspects, wherein the rigidity body keeps the portion of the electrical wire in a non-straight shape According to the first to seventh aspects, the rod-shaped rigidity body that is fixed to the electrical wire along the lengthwise direction of the electrical wire is provided in the corrugated tube, and thus the path of the portion of the wire harness can be kept. Furthermore, by changing the length and the like of the rigidity body, the portion of the wire harness that has high bending rigidity can be easily changed.

In particular, according to the fourth and fifth aspects, the bending rigidity of that portion of the electrical wire that is provided with the rigidity body is even higher, the portion of the electrical wire. Accordingly, in the wire harness, the bending rigidity of the portion provided with the rigidity body can be even higher.

DETAILED DESCRIPTION OF EMBODIMENTS

Figure 1:
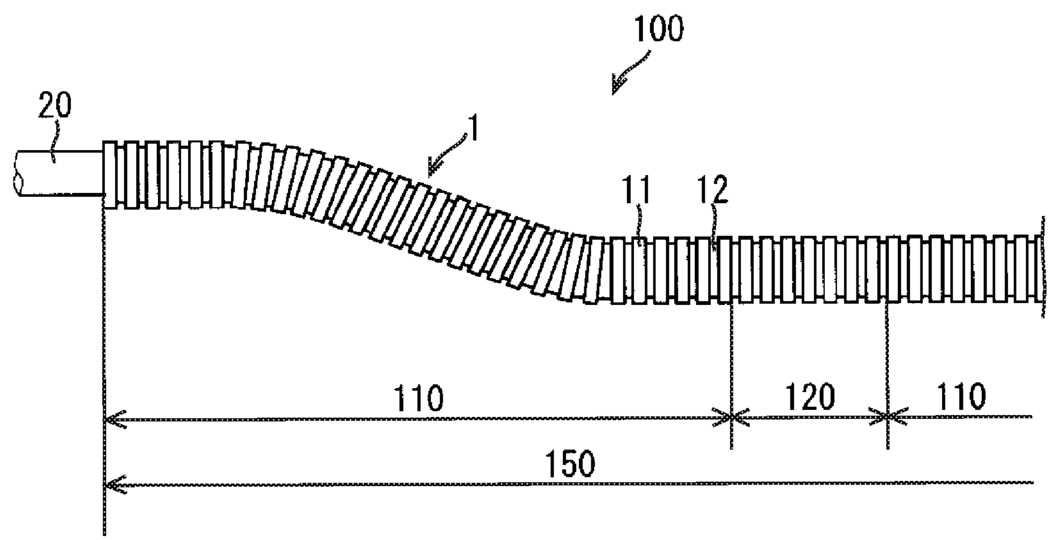
FIG. 1 is a side view showing an example of a wire harness.

FIG. 1 is a side view showing an example of a wire harness 100. As shown in FIG. 1, the wire harness 100 includes an electrical wire bundle 20 formed of multiple electrical wires, and a corrugated tube covering the circumference of the electrical wire bundle 20. The corrugated tube 1 is a tubular member, and is made of a resin or the like. In the corrugated tube 1, annular protruding portions 11 and annular recessed portions 12 are alternately arranged along its lengthwise direction. The lengthwise direction of the corrugated tube 1 can also be said to be the direction in which the corrugated tube 1 extends.

The annular protruding portions 11 are portions that annularly protrude as viewed from the outer peripheral side of the corrugated tube 1. These portions form annular recessed portions as viewed from the inner peripheral side of the corrugated tube 1. The annular recessed portions 12 are portions that are annularly recessed as viewed from the outer peripheral side of the corrugated tube 1. These portions form annular protruding portions as viewed from the inner peripheral side of the corrugated tube 1. The corrugated tube 1 can be elastically deformed at the step portions between the annular protruding portions 11 and the annular recessed portions 12, and thus the corrugated tube 1 itself has the property of being easily bent and deformed.

In the wire harness 100, a portion 150, in which the corrugated tube 1 is provided, includes a first part 110 having low bending rigidity and a second part 120 having high bending rigidity. The first part 110 is easy to bend, and the second part 120 is hard to bend. In the second part 120, a rigidity providing member 3 (rigidity body), which provides rigidity to the electrical wire, is provided inside of the corrugated tube 1. This configuration provides the second part 120 with high bending rigidity. On the other hand, in the first part 110, the rigidity providing member 3 is not provided inside of the corrugated tube 1. Accordingly, the bending rigidity of the first part 110 is low.

Figure 2:
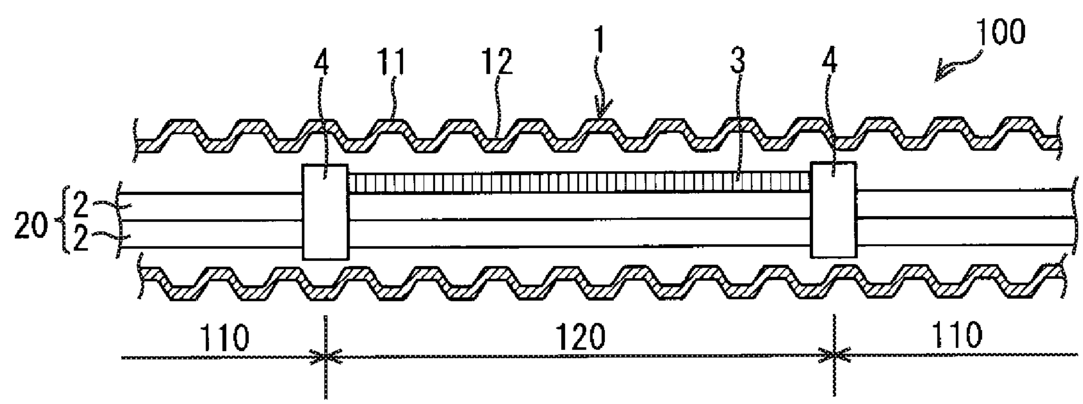
FIG. 2 is a diagram showing an example of a state inside of a corrugated tube.

FIG. 2 is a diagram showing an example of a state inside of the corrugated tube 1 at the second part 120. In FIG. 2, the cross-section of the corrugated tube 1 is shown by oblique lines. Also, to distinguish the rigidity providing member 3 and the multiple electrical wires 2 that constitutes the electrical wire bundle 20, in FIG. 2, hatching with vertical lines is shown in the rigidity providing member 3.

As shown in FIG. 2, the rod-shaped rigidity providing member 3, which is fixed to a portion along the lengthwise direction of the electrical wire bundle 20 extending along that lengthwise direction, is provided inside of the corrugated tube 1. The rigidity providing member 3 is harder to bend than the electrical wire 2, and the bending rigidity of the rigidity providing member 3 is higher than that of the electrical wire 2. The rigidity providing member 3 is, for example, constituted by metal. If the rigidity providing member 3 is constituted by a light metal such as aluminum, the weight of the wire harness 100 can be reduced. When the rigidity providing member 3 is compared with an electrical wire 2 having the same length as the rigidity providing member 3, the rigidity providing member 3 may be lighter than the electrical wire 2. Note, that the material of the rigidity providing member 3 is not limited to metal.

The rigidity providing member 3 is fixed to the electrical wire bundle 20 by a fixing member 4. The fixing member 4 may be, for example, a tape or a clamping band. If the fixing member 4 is a tape, the rigidity providing member 3 is fixed to the electrical wire bundle 20, by the tape being wrapped around the rigidity providing member 3 and the electrical wire bundle 20. In the example shown in FIG. 2, both ends in the lengthwise direction of the rod-shaped rigidity providing member 3 are fixed to the electrical wire bundle 20 by the fixing members 4.

In the example shown in FIG. 2, the rigidity providing member 3 has a straight-rod shape. A portion of the electrical wire bundle 20 is kept in a straight shape with the rigidity providing member 3. The rigidity providing member 3 can also be referred to as a “brace”.

The portion of the electrical wire bundle 20 to which the rigidity providing member 3 is attached, that is, the portion whose shape is kept by the rigidity providing member 3 has higher bending rigidity than the other portions. Accordingly, in the wire harness 100, the portion in which the rigidity providing member 3 is provided inside of the corrugated tube 1 is the second part 120 that has high bending rigidity.

The wire harness 100 having the above configuration is, for example, installed under the floor of a vehicle such as an automobile. The wire harness 100 electrically connects multiple electric apparatuses provided in a vehicle. The installation location of the wire harness 100 is not limited to under the floor of a vehicle.

As shown in FIG. 1, for example, the wire harness 100 may be installed in a vehicle with a state in which its first part 110 having low bending rigidity is bent. In the wire harness 100, the rigidity providing member 3 is not provided inside of the corrugated tube 1 corresponding to the portion that is installed in a bent state. Note, that it is not necessary that the wire harness 100 is always bent at the first part 110.

Also, in the wire harness 100, the bending rigidity of the second part 120 provided with the rigidity providing member 3 is high, and thus the path of the second part 120 is kept. In this example, because a portion of the electrical wire bundle 20 is kept in a straight shape with the rigidity providing member 3, the path of the second part 120 can be kept in a straight shape.

Figure 3:
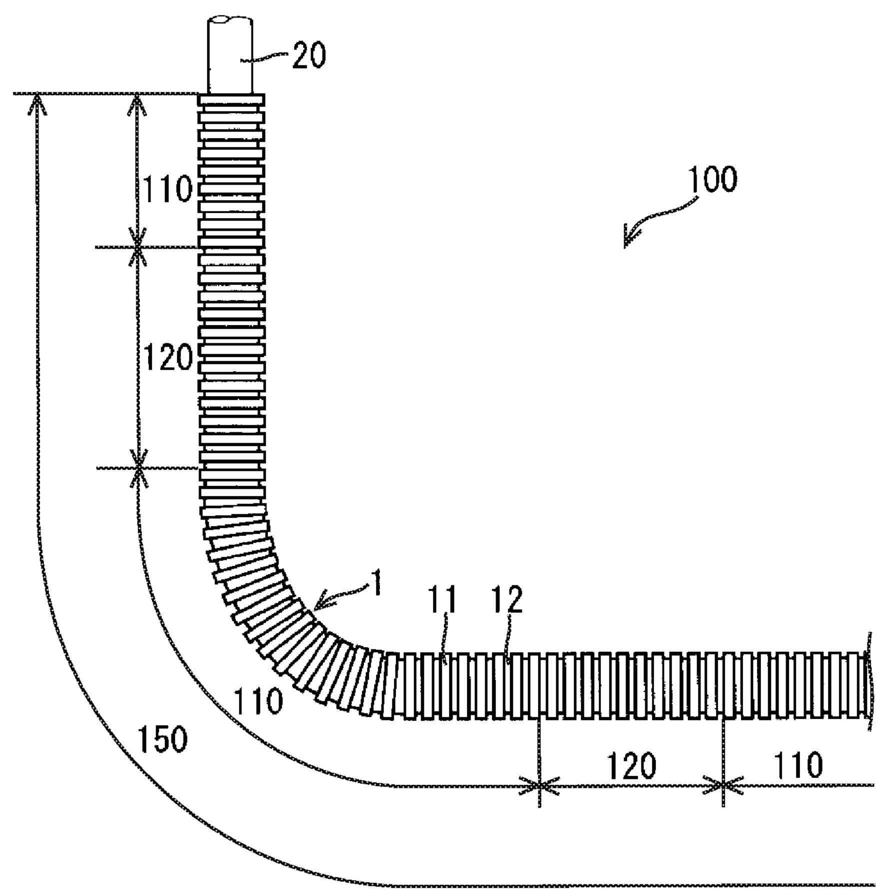
FIG. 3 is a side view showing an example of the wire harness.

Note, that the electrical wire bundle 20 of the above example may also be changed to just one electrical wire 20. In this case, the one electrical wire 2 is covered with the corrugated tube 1. In addition, as shown in FIG. 3, multiple second parts 120 may also be provided in the wire harness 100, the multiple second parts 120 being spaced apart from each other in the lengthwise direction.

As mentioned above, in the wire harness 100, because the rod-shaped rigidity providing member 3, which is fixed to the electrical wire 2 along the lengthwise direction of the electrical wire 2, is provided in the corrugated tube 1, the path of a portion of the wire harness can be kept.

Furthermore, by changing the length and the like of the rigidity providing member 3, the second part 120 having high bending rigidity of the wire harness 100 can be easily changed, without changing the structure of the corrugated tube 1. By changing the length of the rigidity providing member 3, for example, the length of the second part 120 having high bending rigidity can be easily changed. Also, in the electrical wire 2, the location of the second part 120 having high bending rigidity can be easily changed, by changing a portion to which the rigidity providing member 3 is attached.

Figure 4:
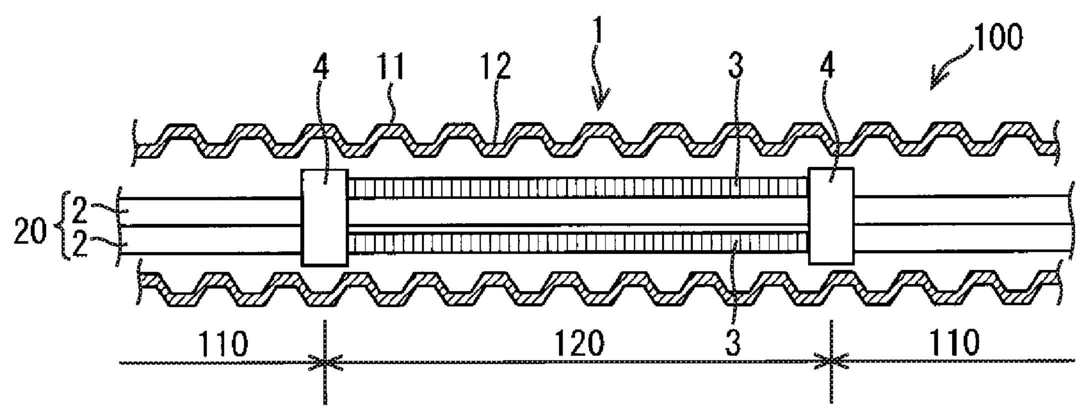
FIG. 4 is a diagram showing an example of a state inside of the corrugated tube.

Note, that in the above example, one rigidity providing member 3 is fixed to the electrical wire bundle 20, but multiple rigidity providing members 3 may also be fixed to the electrical wire bundle 20 as shown in FIG. 4.

Figure 5:
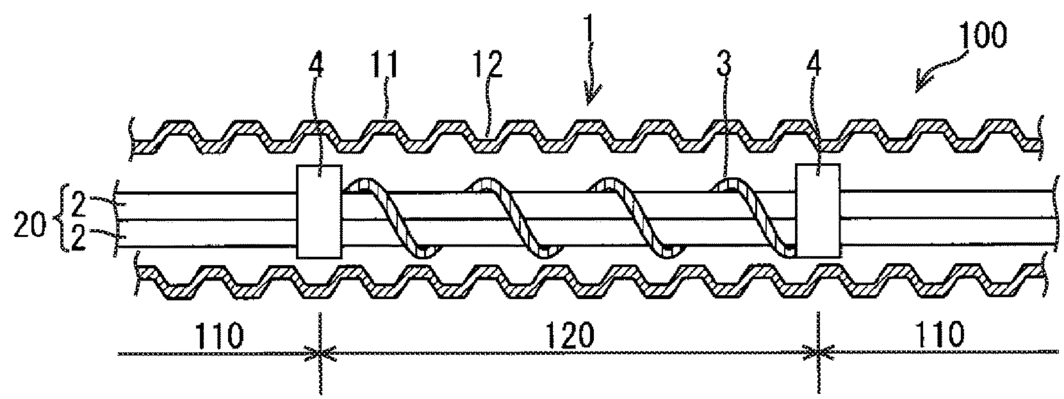
FIG. 5 is a diagram showing an example of a state inside of the corrugated tube.

Note, that the shape of the rigidity providing member 3 is not limited to the shape mentioned in the above example. As shown in FIG. 5, for example, the rigidity providing member electrical 3 may also spirally surround the periphery of a portion of the electrical wire bundle 20. In this manner, the bending rigidity of the portion of the electrical wire bundle 20, to which the rigidity providing member 3 is attached, is even higher. Accordingly, in the wire harness 100, the bending rigidity of the second part 120 provided with the rigidity providing member 3 can be even higher. As a result, the shape of the second part 120 can be more reliably kept. Alternatively, the weight of the rigidity providing member 3 can be reduced by making the rigidity providing member 3 thinner. When the rigidity providing member 3 having a spiral shape is used for keeping the shape of the electrical wire bundle 20, the rigidity providing member 3 that was formed into a spiral shape is prepared. Then, the rigidity providing member 3 can be easily attached to the electrical wire bundle 20, by passing the electrical wire bundle 20 through the spiral shape of the rigidity providing member 3.

Figure 6:
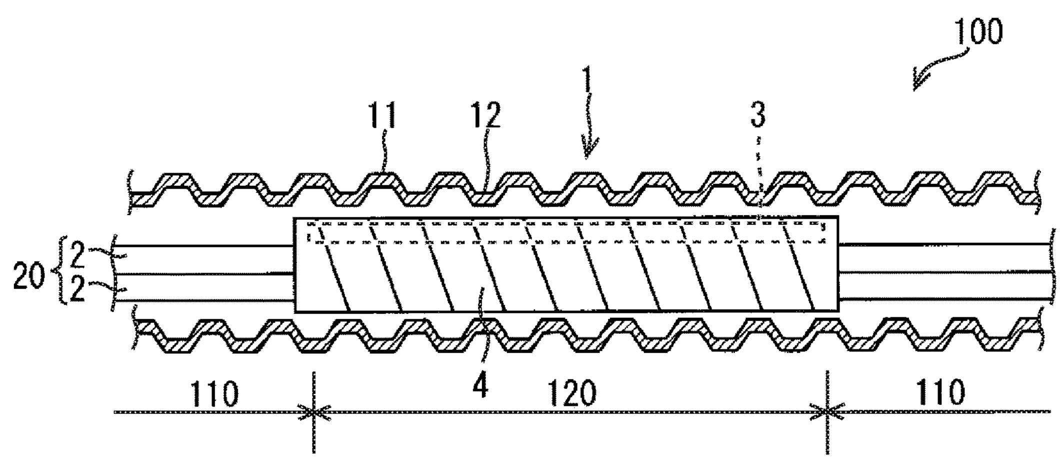
FIG. 6 is a diagram showing an example of a state inside of the corrugated tube.

Also, a fixing member 4 such as a tape, which is wrapped around the rigidity providing member 3 and the electrical wire bundle 20, may also be provided from one end to the other end in the lengthwise direction of the rigidity providing member 3. FIG. 6 shows an example of a state in which a narrow-width tape, as the fixing member 4, is spirally wrapped around from one end to the other end in the lengthwise direction of the rigidity providing member 3. If the fixing member 4 is spirally wrapped around the rigidity providing member 3 and the electrical wire bundle 20, as shown in FIG. 6, half-overlapped wrapping may also be adopted, or sparse wrapping may also be adopted.

Figure 7:
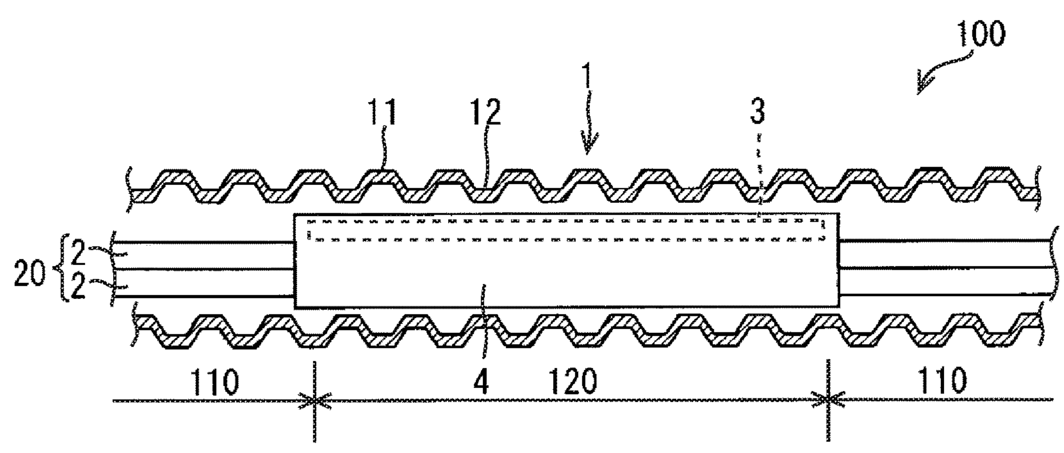
FIG. 7 is a diagram showing an example of a state inside of the corrugated tube.

FIG. 7 shows an example of a state in which a tape, as the fixing member 4, having a slightly wider width than the length of the rigidity providing member 3 is wrapped around the rigidity providing member 3. In the example shown in FIG. 7, the tape is wrapped around the rigidity providing member 3 and the electrical wire bundle 20 so that the direction in which the tape is wound is always the same as the circumferential direction of an object, around which the tape is wrapped, constituted by the rigidity providing member 3 and the electrical wire bundle 20. This winding method is sometimes called "longitudinal wrapping".

As shown in FIGS. 6 and 7, if the fixing member 4 that is wrapped around the rigidity providing member 3 and the electrical wire bundle 20 is provided from the one end to the other end in the lengthwise direction of the rigidity providing member 3, the bending rigidity of the electrical wire bundle 20 to which the rigidity providing member 3 is fixed is even higher. Accordingly, in the wire harness 100, the bending rigidity of the second part 120 provided with the rigidity providing member 3 can be even higher. As a result, the shape of the second part 120 can be more reliably kept.

Figure 8:
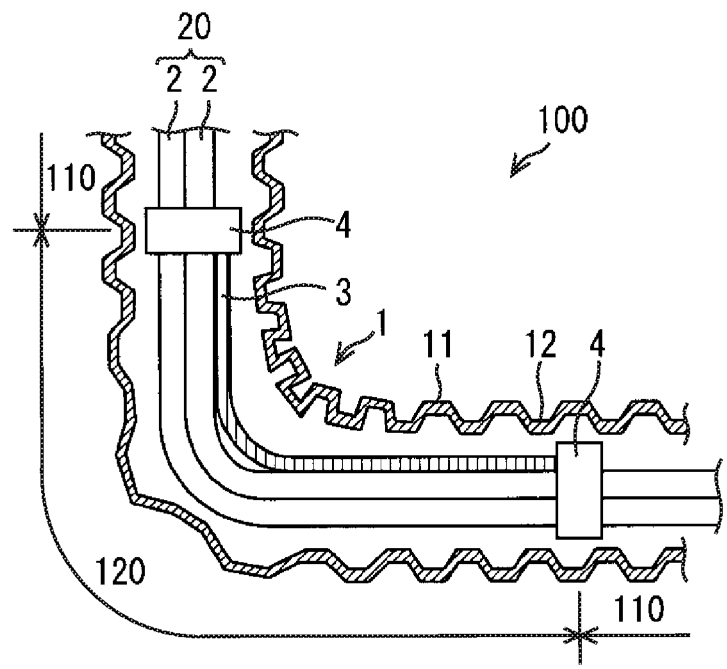
FIG. 8 is a diagram showing an example of a state inside of the corrugated tube.

In the above examples, the portion of the electrical wire 2 is kept in a straight shape by the rigidity providing member 3, but the portion of the electrical wire 2 may also be kept in a curved shape by the rigidity providing member 3. In other words, a portion of the electrical wire 2 may also be kept in a non-straight shape by the rigidity providing member 3. In this case, in the wire harness 100, the portion in which the rigidity providing member 3 is provided is also kept in a curved shape. As shown in FIG. 8, by using the rigidity providing member 3 corresponding to the shape of the portion of the electrical wire 2 that is kept in a curved shape, the second part 120 of the wire harness 100 can be kept in the curved shape. In the example shown in FIG. 8, the rigidity providing member 3 is fixed to a portion of an electrical wire bundle 20 that is bent at approximately 90 degrees. In the electrical wire bundle 20, the rigidity providing member 3 is bent at approximately 90 degrees in accordance with the shape of the portion to which that rigidity providing member 3 is fixed. The rigidity providing member 3 has a substantially L-shaped rod shape.

Figure 9:
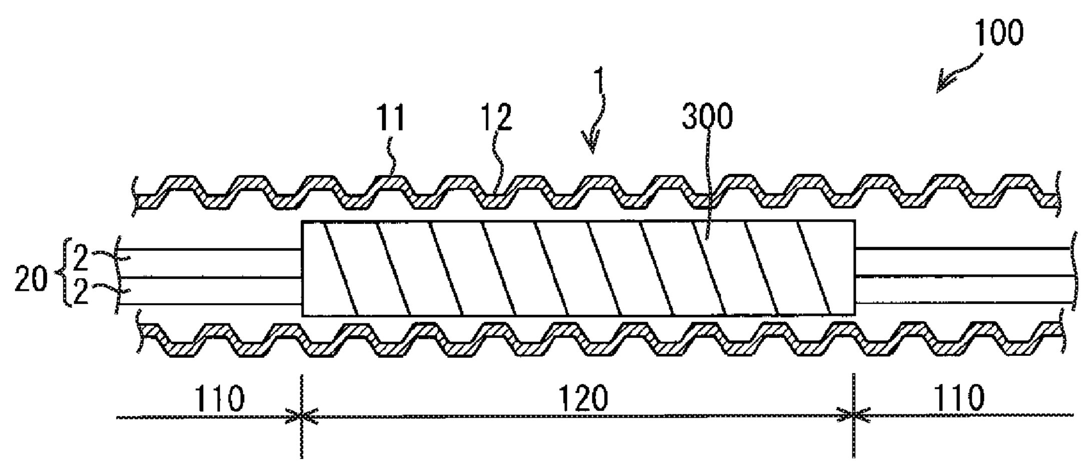
FIG. 9 is a diagram showing an example of a state inside of the corrugated tube.
Figure 10:
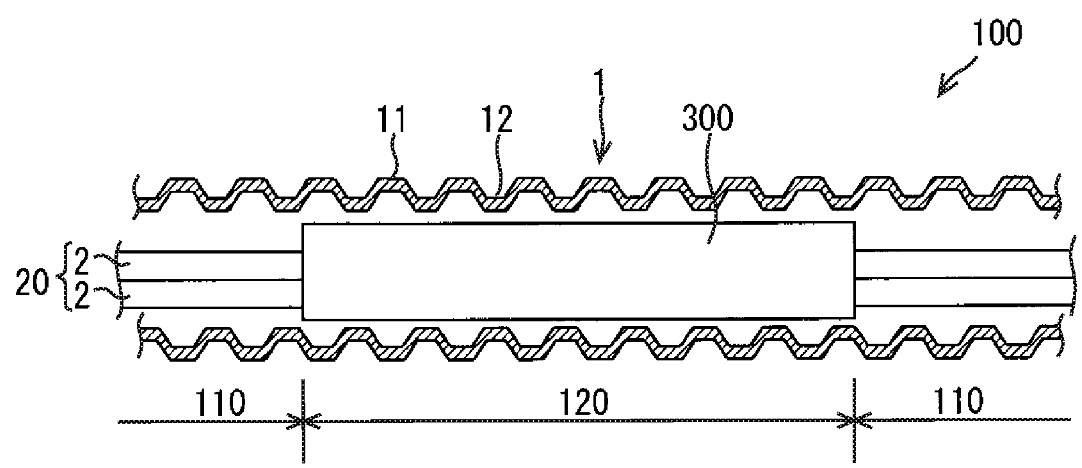
FIG. 10 is a diagram showing an example of a state inside of the corrugated tube.

Also, instead of the rigidity providing member 3, a rigidity providing member 300 such as a tape or a sheet may also be used. This rigidity providing member 300 is wrapped around a portion of the electrical wire bundle 20, and provides the portion with rigidity. In this case, as shown in FIG. 9, the rigidity providing member 300 may also be spirally wrapped around a portion of the electrical wire bundle 20 in a half-overlapping winding manner. Also, as shown in FIG. 10, the rigidity providing member 300 may also be wrapped around the electrical wire bundle 20 so that the direction in which the rigidity providing member 300 is wound is always the same as the circumferential direction of the electrical wire bundle 20. The rigidity providing member 300 may be a tape or a sheet that can keep the shape of a part of the electrical wire bundle 20. As the rigidity providing member 300, for example, a curing tape, a moisture-curing tape, a thermosetting tape, a photocuring tape, or the like is employed. Note, that the rigidity of the electrical wire bundle 20 can be increased, by increasing the number of turns of the rigidity providing member 300.

In this manner, if the rigidity providing member 300 is wrapped around a portion along the lengthwise direction of the electrical wire bundle 20, the portion of the wire harness 100 is provided with rigidity and the shape of that portion can be kept. Furthermore, by changing a range of the electrical wire bundle 20 around which the rigidity providing member 300 is wrapped, the length and the position of a portion of the wire harness 100 that has high bending rigidity can be easily changed.

Although the wire harness 100 has been described in detail thus far, the foregoing description is in all aspects illustrative and the present disclosure is not limited thereto. Also, the above various modifications can be applied in combination as long as they do not contradict with each other. Then, it will be appreciated that numerous modifications not illustrated herein can be made without departing from the scope of the present disclosure.

The invention claimed is:

1. A wire harness, comprising:
an electrical wire;
a rod-shaped rigidity body that (i) is fixed to a portion of the electrical wire along a lengthwise direction of the electrical wire to provide the portion of the electrical wire with rigidity and (ii) extends, for an entirety of its length, in a direction parallel to the lengthwise direction of the electrical wire; and
a corrugated tube covering the electrical wire and entirely covering the rigidity body.

2. The wire harness according to claim 1, wherein
the rigidity body is made of metal.

3. The wire harness according to claim 1, wherein
the rigidity body has a straight-rod shape.

4. The wire harness according to claim 1, wherein
the rigidity body keeps the portion of the electrical wire in a straight shape.

5. The wire harness according to claim 1, wherein
the rigidity body keeps the portion of the electrical wire in a non-straight shape.

6. A wire harness comprising:
an electrical wire;
a rod-shaped rigidity body that is fixed to a portion of the electrical wire along a lengthwise direction of the electrical wire to provide the portion of the electrical wire with rigidity; and
a corrugated tube covering the electrical wire and entirely covering the rigidity body,
wherein the rigidity body helically surrounds a periphery of the portion of the electrical wire.

7. A wire harness, comprising:
an electrical wire;
a rod-shaped rigidity body that is fixed to a portion of the electrical wire along a lengthwise direction of the electrical wire to provide the portion of the electrical wire with rigidity;
a corrugated tube covering the electrical wire and entirely covering the rigidity body; and
a fixing member for fixing the rigidity body to the portion of the electrical wire,
wherein the fixing member is wrapped around the rigidity body and the portion of the electrical wire, and is provided from one end to an other end in a lengthwise direction of the rigidity body.

* * * * *